…

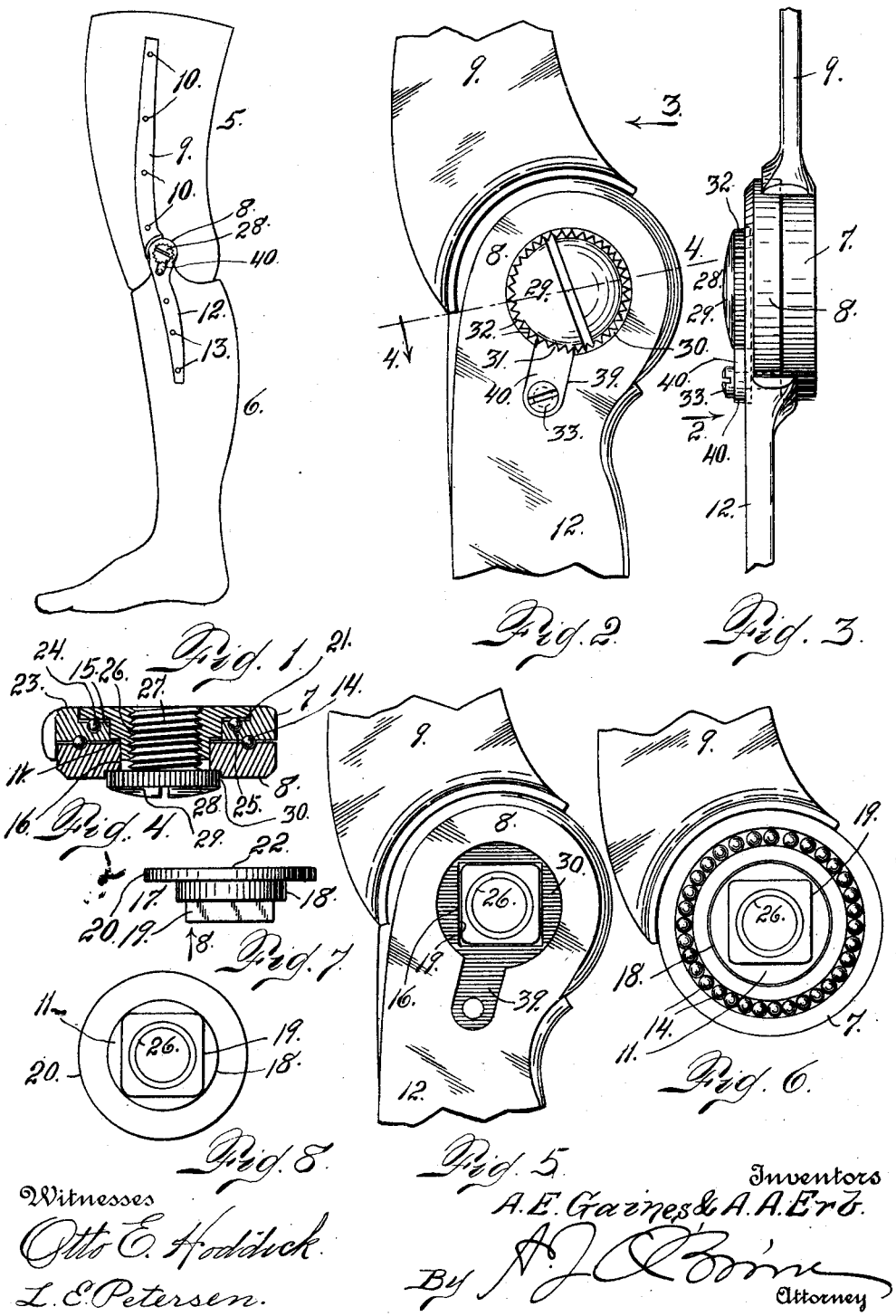

UNITED STATES PATENT OFFICE.

ARTHUR E. GAINES AND ARTHUR A. ERB, OF DENVER, COLORADO.

KNEE-JOINT FOR ARTIFICIAL LIMBS.

1,124,220.  Specification of Letters Patent.  Patented Jan. 5, 1915.

Application filed January 23, 1914. Serial No. 813,880.

*To all whom it may concern:*

Be it known that we, ARTHUR E. GAINES and ARTHUR A. ERB, citizens of the United States, residing at the city and county of Denver and State of Colorado, have invented certain new and useful Improvements in Knee-Joints for Artificial Limbs; and we do declare the following to be a full, clear, and exact description of the invention, such as will enable others skilled in the art to which it appertains to make and use the same, reference being had to the accompanying drawings, and to the characters of reference marked thereon, which form a part of this specification.

Our invention relates to improvements in knee joints for artificial limbs, our object being to provide a ball bearing joint of this character which shall be exceedingly efficient in construction, as well as reliable and durable in use.

In our improved joint there are two main members connected in operative relation on each side of the artificial limb, whereby the lower portion of the limb below the knee is connected with the upper portion thereof. The movable parts of each of these joint features are connected to coöperate and from these main portions of the joint, straps extend both upwardly and downwardly and are secured to the adjacent members of the limb. As the construction is duplicated on each side of the limb, a single joint feature only will be illustrated and described.

One novel feature of our improved joint consists in the fact that the two sets of ball bearings employed in the joint, are arranged in staggered relation, instead of directly opposite. In other words, one set of ball bearings is located in a race-way of smaller diameter than the other set. This makes it practicable to employ a thinner member between the two sets of bearings, since if the race-ways were of the same diameter there would be less thickness of material between them measured on a straight line between their centers, than where the race-ways are of different diameters and the ball bearings are arranged in the relation heretofore described.

Having briefly outlined our improved construction we will proceed to describe the same in detail, reference being made to the accompanying drawing, in which is illustrated an embodiment thereof.

In this drawing: Figure 1 is a side elevation of an artificial limb equipped with our improvement, the joint construction on one side thereof only being shown. Fig. 2 is a detail view of the complete joint located on one side of the limb, the parts being shown on a much larger scale than in Fig. 1. Fig. 3 is an edge view of the construction shown in Fig. 2, being a view looking in the direction of arrow 3, Fig. 2. Fig. 4 is a section taken through the joint on the line 4—4, Fig. 2. Fig. 5 is a view similar to Fig. 2, with a portion of the joint removed, namely the screw for connecting the parts in the assembled relation. Fig. 6 is a view with an additional portion of the joint removed, exposing one set of ball bearings. Fig. 7 is a detail view of the cone member of the joint. Fig. 8 is a face view of the member shown in Fig. 7, or a view looking in the direction of arrow 8, Fig. 7.

The same reference characters indicate the same parts in all the views.

Let the numeral 5 designate the upper member and 6 the lower member of the artificial limb. Our improved joint is employed to connect these members in operative relation at the knee. As heretofore explained, as the construction is duplicated on both sides, one set of joint parts only is illustrated and but one set will be described.

Let the numerals 7 and 8 designate the two main parts of the joint, which are respectively secured to the limb members 5 and 6. The part 7 is formed integral with a metal strap 9, which extends above the joint and is fastened to the limb member 5 in any suitable manner, as by securing devices 10. The part 8 is provided with a downwardly extending metal strap 12, which is secured to the lower member 6 of the limb by means of fastening devices 13. Between the joint parts 7 and 8 a set of bearing balls 14 is located, the said balls being placed within a raceway formed partly in each member.

The member 7 has a cylindrical opening 15, while the member 8 has an opening 16 of rectangular form, preferably square.

A so-called cone member 17 is inserted in the openings 15 and 16 of the parts 7 and 8, the said cone member having a cylindrical portion 18 which fits into the opening 15 of the member 7, and a square portion 19 which fits into the square opening 16 of the member 8. The distance between the opposite diagonal corners of the squared portion 19 of the cone member, is the length of the diameter of the cylindrical or circular member 18. By virtue of this construction the cone member is equipped with segmental shoulders 11, which are arranged adjacent, corresponding faces formed on the member 8 of the joint.

By virtue of the fact that the squared part 19 of the cone member fits into the square opening 16 of the member 8, it is evident that the cone member and the member 8 are connected to prevent independent rotary movement.

The cone member 17 has a relatively large circular flange 20, which enters a recess 21 of counterpart shape formed in the member 7, whereby when the parts are assembled the outer face 22 of the cone member is flush with the adjacent face 23 of the member 7.

Between the flange 20 and the bottom of the recess 21 of the member 7 parts of a set of ball bearings 24 are located. These bearing balls are located in a race-way 25 formed in the member 7 and communicating on one side with the recess 21. When the cone member 17 is applied to the joint (see Fig. 4), the inner face of the flange 20 engages the bearing balls 24, whereby the adjacent faces of the flange 20 and the bottom of the recess 21, are slightly separated. By virtue of this construction the bearing balls 24 prevent any contact between the adjacent faces of the two parts, whereby friction is reduced to a minimum. Attention is also called to the fact that the bearing balls 14 are so arranged between the two members 7 and 8 of the joint that the adjacent faces of these members are separated, hence the adjacent movable parts of the joint are so connected as to reduce friction to the smallest possible degree.

By referring to Fig. 4 of the drawing it will be observed that the diameter of the race-way 25 in which the bearing balls 24 are located is less than the diameter of the race-way in which the bearing balls 14 are located. By virtue of this construction the portion of the part 7 between the two race-ways has much greater strength, than would be the case if the race-ways for both sets of bearing balls were of the same diameter. Hence, with our present form of construction it becomes practicable to use a member 7, whose portion between the two race-ways is thinner, than if the race-ways were of the same diameter, and still have a joint of the same strength.

The cone member 17 has a centrally located threaded opening 26 adapted to receive the threaded shank 27 of a screw 28, having a relatively large head 29, which when the parts are assembled engages a shallow recess 30 formed in the outer surface of the member 8, around the square opening 16 which the squared part 19 of the cone member enters. By virtue of this construction the head 29 of the screw extends slightly beyond the outer face of the member 8, whereby the strength of the joint is greater than if the recess 30 were formed of sufficient depth to completely countersink the head of the screw. The free extremity of the shank 27 of the screw, is flush with the adjacent surface of the cone member 17 when the parts are assembled.

From the foregoing description the manner of assembling, as well as the operation, of our improved knee joint will be readily understood. The two parts 7 and 8 are first brought together in coöperative relation, with the bearing balls 14 in place. The cone member 17 is then inserted or placed in the assembled relation, whereby its flange 20 enters the recess 21 of the member 7, its cylindrical part 18, the opening 15 of counterpart shape in the member 7, while the square part 19 enters the opening 16 of counterpart shape formed in the member 8. The screw 28 is then introduced from the opposite side of the joint, and threaded into the cone (see Fig. 4), whereby all of the parts of the joint are brought together in the assembled relation.

In order to lock the screw 28 in the adjusted position the outer face of the member 8 is recessed as shown at 39 to partially receive a locking lug 40, which is toothed on one extremity as shown at 31 to fit the corresponding teeth 32 formed on the periphery of the screw 28. When this lug is inserted in the recess 39 and its teeth fitted into the corresponding teeth 32 of the screw 28, a fastening device having a small screw 33 will be inserted in a perforation formed in the lug, and threaded into the member 8, some distance below the movable parts of the joint, whereby the perforation for the screw 33 does not weaken the joint, as would be the case if the fastening screw 33 were inserted close to the periphery of the screw 28.

Having thus described our invention, what we claim is:

A knee joint for artificial limbs, including two main members respectively provided with metal straps secured to the respective members of the limb above and below the knee, the said main parts containing a race-way formed partly in each part, bearing balls located in the said race-way, one of the said members being recessed on its face opposite from that adjacent the other main member, the bottom of the said recess being provided with a second race-way of different diameter from that in which the first named set of bearing balls is located, bearing balls located in said second race-way, a cone member inserted in openings formed in the two main parts and having a flange entering the recess of one main part and engaging the bearing balls tangentially therein, a screw threaded into an opening formed in the cone member and engaging one of the main members on the opposite side of the joint from the cone member, whereby the joint parts are connected in the assembled relation, and means for locking the said screw in the adjusted position, comprising an elongated lug located in a recess formed in one of the members adjacent the screw, the said lug being toothed to interlock with same, similar teeth formed on the periphery of a screw, and a means for fastening the lug in place substantially as described.

In testimony whereof we affix our signatures in presence of two witnesses.

ARTHUR E. GAINES.
ARTHUR A. ERB

Witnesses:
LENA DILLMAN,
A. EBERT O'BRIEN.